Figure 1:
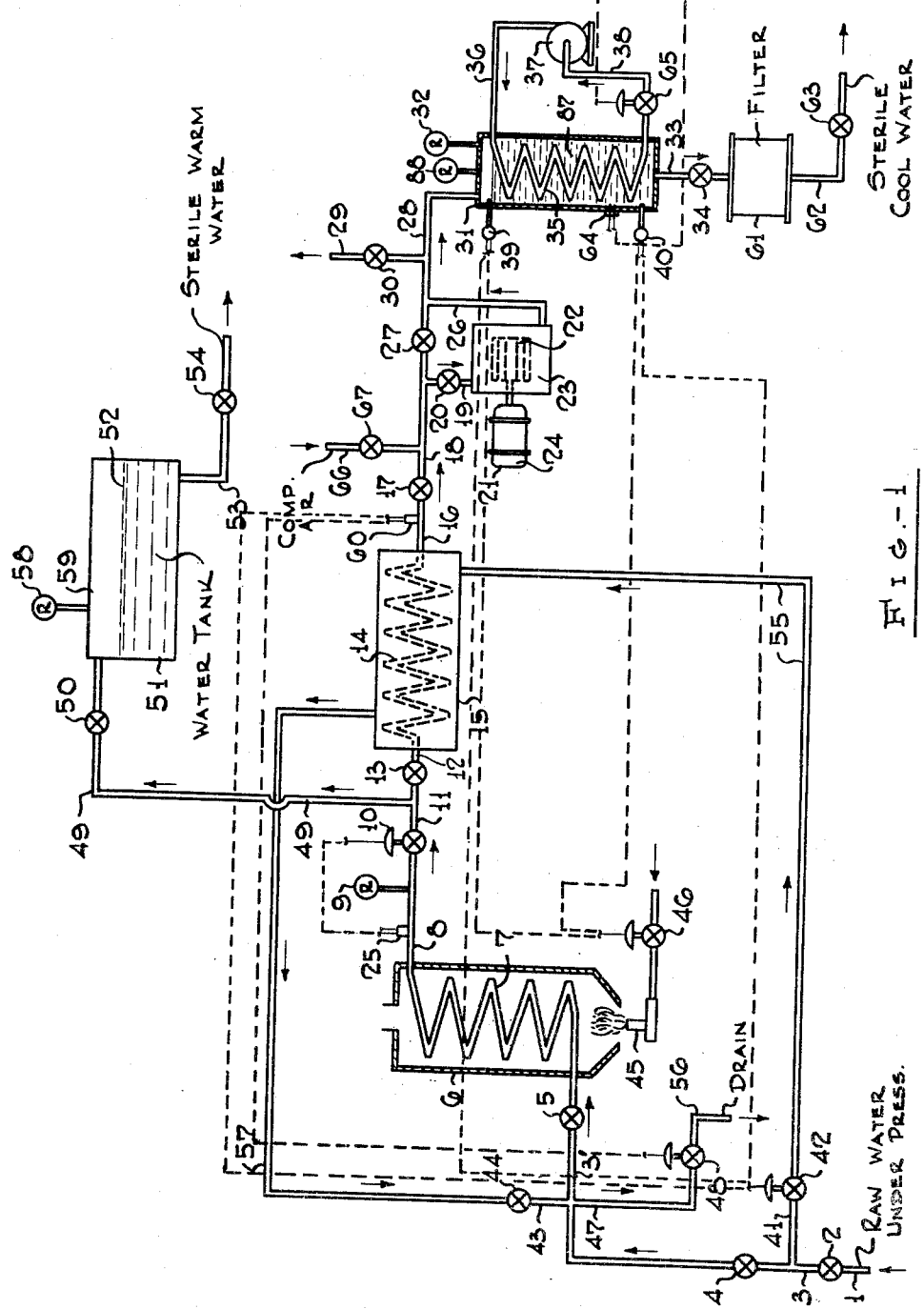

Dec. 15, 1953

P. J. GAYLOR 2,662,508

METHOD AND APPARATUS FOR PROVIDING A CONTINUOUS
SUPPLY OF HEAT STERILIZED WATER

Filed March 15, 1947

2 Sheets-Sheet 1

Peter J. Gaylor Inventor

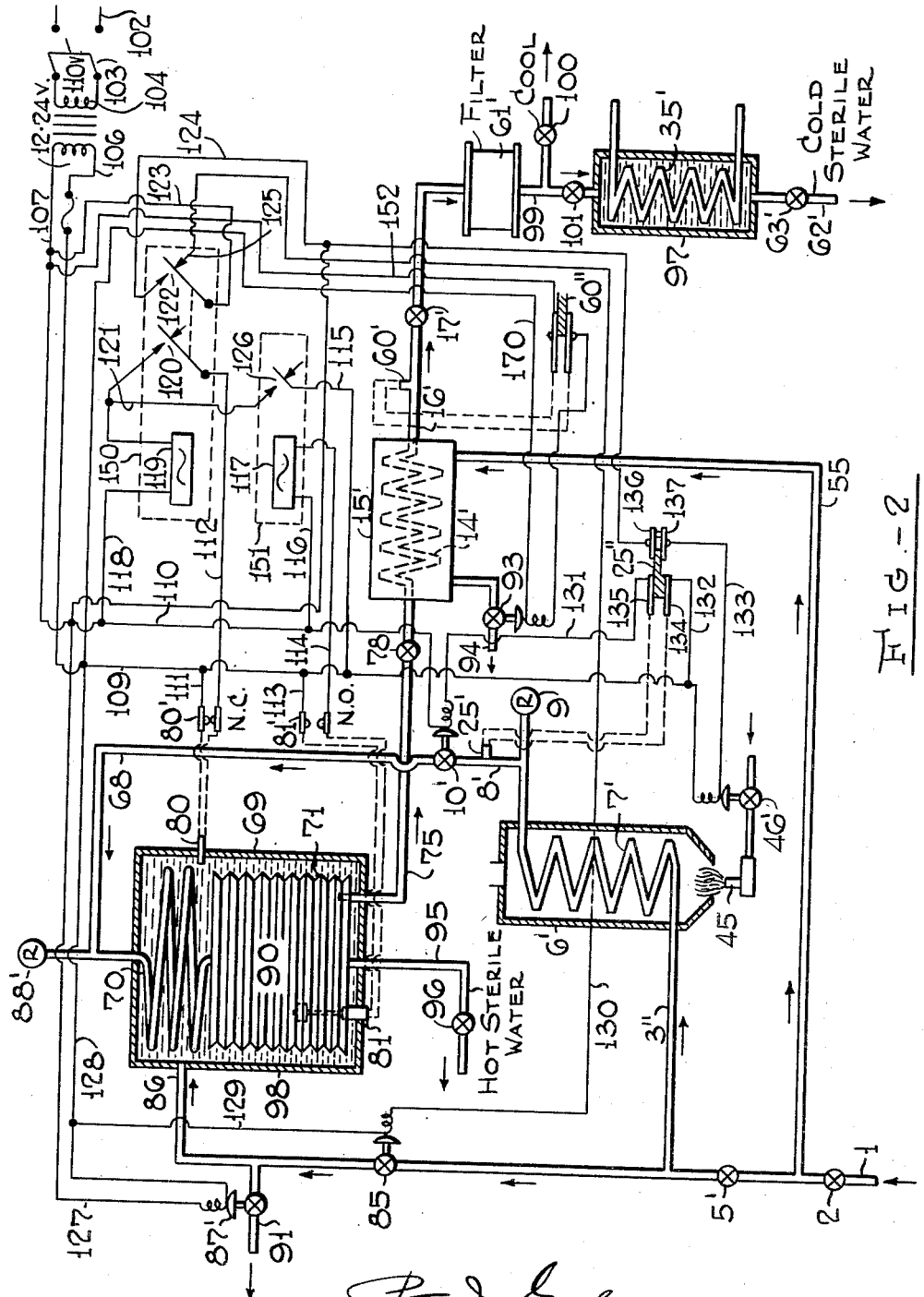

Patented Dec. 15, 1953

2,662,508

UNITED STATES PATENT OFFICE 2,662,508

METHOD AND APPARATUS FOR PROVIDING A CONTINUOUS SUPPLY OF HEAT STERILIZED WATER

Peter J. Gaylor, Union, N. J.

Application March 15, 1947, Serial No. 734,902

8 Claims. (Cl. 122—448)

This invention deals with the production of sterile water obtained by heating. More specifically, it relates to a method and apparatus for continuously supplying piped heat-sterilized water for household, hospital and other uses.

At the present time, piped drinking water is usually available from one source, and that is the municipal water supply. In the old days when typhoid fever, anthrax, yellow fever and similar bacterial diseases were the most prevalent infectious diseases, the sterility of this type of water supply was generally "satisfactorily" controlled by chlorination and filtration, although contamination often occurred by pollution with river water and the like, by opening of wrong valves by attendants, etc.

However, the situation has changed in recent years. By the introduction of newer antibiotics and other advances in medicine, personal care and cleanliness, the more common types of bacterial infectious diseases gradually have been eliminated, so that greater stress is now placed on the so-called "virus" diseases, such as poliomyelitis, certain types of pneumonia, cancer, etc., and these diseases are now claiming an increasingly greater proportion of deaths and sicknesses.

Many of these "viruses" are very resistant to chemical agents such as chlorine, so that there is now a question as to the adequacy of conventional water sterilization methods. However, most experts do agree that sterilization by boiling is effective against practically all forms of infection.

One object of this invention is to provide a means for supplying continuously piped water, sterile water which employs municipal water as the source material. Another object is to provide an automatic sterilization means employing heat and pressure only as required. Still another object is to provide a novel tank for storing the sterile water so produced. Other objects will become more apparent from the following description.

The invention will be more readily understood by reference to the drawings in which Figure 1 represents a flowsheet, in cross-sectional elevation of a preferred cold water storage type of operation, with dotted lines indicating which controls actuate the devices depicted. Shown in Figure 2 with accompanying electrical controls, is a flowsheet, in cross-sectional elevation, of an operation, according to the present invention, in which hot water storage is employed. Figure 2 shows both equipment and electrical circuits operating in conjunction with each other. Similar numerals refer to similar parts in the various figures.

Referring again to the drawings, numeral 1 designates a pipe supplying raw water under pressure, preferably from a municipal water supply, the supply of which may be shut off by means of shut-off valve 2. The water enters through valve 2, then flows through pipe 3 (Fig. 1) and into line 41 provided with electrically controlled valve 42, the operation of which may be controlled by thermostatically actuated switch 60, and level switches 39 and 40.

The water leaving valve 42 enters pipe 55 and then heat exchanger 15 where it is employed to cool the sterile water passing through cooling coil 14. In turn, the water in exchanger 15 is heated and leaves through line 57 and valve 44 and enters feed line 3' leading to the sterilizing coil 7. During these operations, valve 4 remains closed.

As mentioned previously, this preheated water from pipe 43 is run through pipe 3', thence through shut-off valve 5, and into sterilizing coil 7. However, some of the water coming from pipe 43 may be bled off through drain line 56 by electrically controlled throttling valve 48 which is actuated by thermostatic switch 60. The amount of water to be drained off through throttling valve 48 is dependent upon the temperature of raw water entering pipe 1, the amount of cooling surface in coil 14, and the rate at which sterile water is consumed as it comes out of coil 14.

The preheated water entering coil 7 is heated by a gas burner 45 having a source of gas supply with electrically controlled shut-off valve 46 (or some other equivalent heating means), the heating being done in insulated heater 6. The size of the heater and size of coils 7 are determined by the amount of water to be used. However, no water is allowed to pass through coil 7 unless it has been heated to a sufficiently high temperature for a sufficiently long period of time to effect sterilization at the existing water pressure. At atmospheric pressure, water is considered sterilized if it is subjected to 212° F. for about 3 minutes. However, pressure acts as a sterilization aid and thus reduces the time required. It also raises the boiling point of the water. Under 60–80 pounds water pressure, the boiling point of water is about 307–324° F., and under these conditions, sterilization can be effected in 10–20 seconds. It is preferable, for the purpose of the present invention, to keep the water below its boiling point, mainly to conserve on heating and cooling requirements which would be otherwise excessively increased because of the high latent heat of water. It is also preferable to keep the temperature as near as possible to the boiling point of water at the pressure existing in coil 7 which is the same as the pressure of the raw water supply at pipe 1, less friction losses. However, the time of contact in heated coil 7 must be long enough to adequately sterilize the water passing through coil 7. This is insured by adjusting the maximum opening of valve 10 for the conditions of temperature and pressure to be employed.

As the water leaves coil 7 through pipe 8, it passes over thermostatic switch 25 and through electrically controlled cut-off valve 10, which is actuated by thermostatic switch 25. Throttling of valve 10 (in Fig. 1) is controlled by thermostatic switch 25 so as to regulate water flow through coil 7 at a rate slow enough to insure adequate sterilization under the existing conditions when burner 45 is operating. Relief valve 9 is provided in line 8 to relieve any excessive pressure which might accidentally build up, and thus protect the equipment from bursting.

After leaving valve 10, the water enters pipe 11 and may be run into a hot water storage tank 51 by way of line 49 and valve 50. Since dissolved air is driven off during heating of the water in coil 7, it will accumulate as layer 59 above the water 52 in tank 51 and may be automatically vented off by vent valve 58. Sterile warm water may be drawn off through line 53 and valve 54.

If cool water is desired, the water leaving line 11 enters line 12 and valve 13 and then passes into coil 14 which is a part of the heat exchanger wherein the water is cooled by indirect heat exchange with water flowing into exchanger 15, after which the cooled water passes over thermostatic switch 60 and through shut-off valve 17, thence through pipe 18, and valve 27, after which it may be drawn off continuously through line 29 and valve 30.

An intermittent storage system may also be used by allowing the cooled water to flow through line 28 and into tank 31 provided with pressure relief valve 32. This tank has liquid level switches 39 and 40 which are actuated by the level of water 87, the water being drawn off through valve 34, pipe 33, filter 61 (if desired), line 62 and valve 63.

When the water level drops and reaches float switch 40, it closes an electrical circuit which opens valve 42 and fuel valve 46 and starts burner 45, which operation allows water to gradually heat up, eventually actuating switch 25 and opening valve 10 to fill tank 31 until the water level reaches float switch 39 which shuts off valve 42 and fuel valve 46. A refrigerating coil 35 from a refrigerating unit may be inserted in tank 31 to cool water 87 to a lower temperature. Refrigerant is supplied by lines 36 and 38, with compressor 37 provided for compressing the refrigerant which may be air-cooled in the conventional manner. Thermostat switch 64 inserted in water 87 regulates the operation of electrically controlled refrigerant release valve 65.

For re-aerating the water leaving valve 17, an electrically driven mixing unit with motor 21 is provided. The motor rotates vanes 22 to mix the air with the water so as to facilitate dissolving of the air by the water. When this aerating unit is employed, valve 27 is closed and the water then enters through valve 20, line 19, aerating chamber 23 and line 26. It is possible to provide a source of injected air into line 18 by bleeding compressed sterile air, as desired, through line 66 and valve 67. Both the feeding of the compressed air and the operation of aerating motor 21 can be made automatic by the action of float switches 39 and 40. Vent valve 88 is provided to automatically vent off any undissolved air carried into tank 31, and to allow air to enter tank 31 as the water is withdrawn from tank 31. This vent may be provided with suitable sterile filters to keep out contamination and prevent its entry into tank 31.

Valve 10 (Fig. 1) is an electrically controlled throttling valve which closes as the temperature in line 8 decreases to below the value required for sterilization. The thermostatic switch 25, which controls the operation of valve 10, is set for a maximum and minimum temperature of water in line 8, for operation of valve 10. When the water temperature falls below the set value (say about 230–250° F. with water pressure at 80 p. s. i.), valve 10 closes and does not open until the temperature of the water at switch 25 reaches the minimum value for sterilization. If water temperature rises to near the boiling point (say about 310–320° at 80 p. s. i. water pressure), then thermostat switch 25 opens valve 10 wide open, and if temperature at switch 25 still remains at the maximum value for an additional 10 seconds or so, a time-limiting relay in the electrical circuit closes fuel valve 46.

All of the thermostatic controls, electrically controlled valves and relays are conventional equipment now available on the market, the details of which are apparent to those skilled in the art.

If the cool water system, beginning at line 12 (Fig. 1) and extending therefrom, is not desired, then lines 57, 55 and drain line 47 are not required, in which case the water enters through valves 2, 4 and 5 which are open, and tank 51 may be provided with a level control system, such as the one in tank 31, provided with contact or mercury trip switches, or other similar devices for actuating valve 46.

One mode of operation of the system is as follows: In filling tank 31 (Fig. 1), according to the flowsheet presented in the drawings, valve 4 is closed, as is valve 10. When the sterile water is consumed and its level reaches switch 40, fuel valve 46 is opened by switch 40 and burner 45 is ignited, whereupon coil 7 in heater 6 becomes heated. When the heated water at switch 25 reaches the minimum set temperature, valve 10 is thereby opened by switch 25 and sterile water flows by line pressure through line 11 and fills hot water tank 51 (if it is desired) and also flows into heat exchanger coil 14 surrounded by cool water in exchanger 15. When the maximum set temperature of the water is reached at thermostatically controlled switch 60, it automatically opens valve 42 and cool water then flows through line 55 and heat exchanger 15 and the preheated water then enters coil 7 for sterilization, whereupon it is cooled in exchanger 15, passes through the aerating system (if it is desired), and is drawn off continuously through valve 30, or it enters tank 31.

If conditions are such that sufficient cooling is not obtained within a predetermined time, thermostatically controlled switch 60, through a time relay, opens drain valve 48 which allows sufficient cooling water to flow over coil 14 to bring it down to below the maximum set temperature, whereupon valve 48 is automatically closed through action of switch 60.

When the water level in tank 31 reaches switch 39, the latter automatically closes fuel line valve 46, and this causes the temperature of the water in coil 7 to drop. As soon as the temperature at switch 25 reaches the preset minimum, valve 10 closes automatically and prevents any flow of unsterilized water into the sterile tank system. This cycle is then repeated as the sterile water supply is consumed.

Although ordinary steel may be used for the system, with provision for filtering out iron rust and scale, it is preferable to employ a metal of low corrosivity, as for example Monel metal, stainless steel, copper, and the like, stainless steel being preferred. In the case of tanks 51, 31 and 69, enameled inside linings may be employed. It is also possible to pretreat the water by means of zeolites, or the like, to remove hardness and other impurities which may tend to contaminate the lines and equipment. Also, if city water under pressure is not available for line 1, a well water supply brought up to pressure by means of a pump, or similar source may be employed. Furthermore, thermostatically controlled switch 25 may be integrally disposed in valve 10, so that the valve itself will contain the thermostatically actuated mechanism.

Another modification of the present invention is shown in Figure 2. Raw water under pressure enters line 1, passes through open valve 5' and into line 3'', thence into sterilizing coil 7' in heater 6' provided with burner 45' provided with remote automatic shut-off control valve 46'. Exit line 8' is provided with thermostatic control point 25' for switch 25'' which actuates automatic shut-off valve 10'. After the sterile water passes through these units, it enters bellows tank 71 which is employed for storing hot sterile water 90. Tank 69 is provided with high and low water level switches 80 and 81 respectively (the electrical components of which are shown in detail via dotted lines at 80' and 81'), bleed valve 88' for bleeding out liberated air, and a relief valve may be provided for preventing building up of excessive pressure. Tank 69 is maintained at line pressure (raw water pressure less friction drop), and is lagged with lagging 98 to minimize heat losses. Hot sterile water may then be drawn off through pipe 95 and valve 96.

In Figure 2, switch 25'' may be operated from thermostatic control point 25' in any conventional manner, as by insertion of switch 25'' (having bimetallic contacts) into point 25' of pipe 8' in electrical insulating relation thereto, or a thermostatic bulb inserted at point 25' may be made to actuate the contacts of switch 25'' via the dotted lines connecting 25' and 25'', or by any other conventional means which will cause the change in temperature of the water in pipe 8' at point 25' to close or open contacts 134, 135, 136 and 137 of switch 25''. Similarly, switch 60'' is located near pipe 16' at 60' and the temperature of the water in pipe 16' causes either opening or closing of the contacts (bimetallic, if necessary) of switch 60''.

If cool sterile water is desired, the hot water 90 from bellows tank 71 is withdrawn through line 75 and open valve 78, thence through coil 14' cooled by water in cooler 15', then through pipe 16' provided with thermostatic control point 60' for switch 60'' used for actuating automatically controlled valve 93, thence through open valve 17', filter 61' (if desired) and out through line 99 and valve 100.

In the event colder water is desired, the water may be led from line 99, through open valve 101 and into vessel 97 provided with cooling coil 35' from a refrigerating unit (not shown), whereupon the cold sterile water may then be drawn off through pipe 62' and valve 63'.

The automatic action is obtained as follows: When the water level in tank 69 reaches float switch 81, the switch actuates fuel valve 46' causing it to open and ignite the fuel. When the water in coil 7' reaches the minimum setting of switch 25'' required for adequate sterilization, thermostatic switch 25'' actuates valve 10', causing it to open, thereby allowing sterile water to enter bellows tank 71.

When the water level in bellows tank 71 reaches float switch 80, the latter causes fuel valve 46' to close. This, in turn, causes the temperature of the water in coil 7' to drop below the minimum setting of thermostatic switch 25'' which then causes closing of valve 10', thus preventing entry of unsterile water into bellows tank 71.

As the sterile water is drawn out of bellows tank 71 through pipe 75 and cooled coil 14', it raises the temperature of the cooling water in cooler 15' so that the temperature of the water entering line 16' rises until it reaches the maximum setting of the thermostatic controlled switch 60'' which then causes drain valve 93 to open, allowing the heated cooling water to drain off through pipe 94. Since valve 93 is open, cold raw water enters cooler 15' and keeps the water, leaving line 16', at the desired temperature.

In order to illustrate the type of electrical control contemplated, a circuit diagram for the system also is depicted in Figure 2 in which dotted lines indicate connection with or location of electrical switches in the piping diagram and dotted outlines indicate electrical relays. Main house current (110 v.) leads 102 are provided with shut-off switch 103. Below switch 103 is inserted, in the line, transformer 104 for reducing the voltage to 12–24 v. Protective fuse 108 is also provided. Electric lines 106 and 107 coming off the low side of the transformer are then cut in as follows: Tap 109 from fuse 108 is provided with tap 111 leading to normally closed (liquid level control) switch 80', while tap 113 from line 109 leads to normally open (liquid level control) switch 81'. These two switches are actuated by bellows tank 71 containing the hot sterile water 90.

Another tap 128 is taken from line 109 and led to actuate the solenoid in drain valve 87, and a tap 129 from this line or tap 128 is led to the solenoid of filling valve 85. All valves are normally closed (i. e. closed when current is off or when they are not actuated by current). A tap 132 is also taken from line 109 to a contact 134 of thermostatically controlled switch 25'' (Fig. 2). This contact is normally open and is set to close at, say 230° F. at its location in pipe 8' (as shown by the dotted lines). Line 109 is led to the solenoid of fuel valve 46', which is also normally closed.

From line 107, a tap 110 is led off. A branch 118 from this tap leads to the A. C. solenoid 119 of relay 150. Another branch 116 leads to the A. C. solenoid 117 of relay 151. Line 110 is then led to the solenoid of valve 10', which is normally closed and thence to contact 135 of thermostatically controlled switch 25'' (through line 131), which contacts with contact 134 at the set temperature (230° F.).

Another tap 123 from line 107 is led to the center contact of switch 122 in relay 150. One of the contacts of solenoid switch 122 of relay 150 is connected to line 124, thence to line 127 and the said line 124 is also connected to contact 136 of thermostatically controlled switch 25'' which is normally closed in contact with 137, opening at a set temperature, say 320° F. at its location in pipe 8'. Contact 137 of switch 25'' is led to the solenoid of fuel valve 46', via line 133.

Line 112 connects the arm of switch 120 of relay 150 with the lower contact of switch 80'. Line 114 connects the A. C. solenoid 117 of relay 151 with the lower contact of switch 81'.

Line 170 is led to the solenoid of drain valve 93 and to one contact of thermostatically controlled switch 60'' which is normally open but set to close at, say 80° F. in line 16', the other contact of the switch being connected to line 107 by line 152.

The operation of the circuit may be described as follows:

*Filling cycle.*—The bellows tank 71 (Fig. 2) has just closed switch 81' which closes the circuit to lower solenoid 117 of relay 151 which causes the arm (connected to line 115) in switch 126 of relay 151 to contact the left contact, thus completing the electrical circuit to the higher double pole, double throw switch in relay 150. Closure of the left contact of switch 120 in relay 150 locks relay 150 in through the normally-closed bellows contact 80'. Therefore, relay 150 will stay closed until contacts 80' open when the bellows are full. Closure of left and center contacts of switch 122 of relay 150 energizes valve 87' (which opens the drain) and also energizes gas valve 46' (which turns on the gas flame).

*Emptying cycle.*—The bellows tank 71 rises and opens switch contacts 81'. This opens the current circuit (holding circuit 111, 112, 120, 119, 118) of relay 150, as the bellows has already opened the lower contacts 81', causing relay 150 to drop out when the movable (middle) contact of the switch 122 of relay 150 engages the right (stationary) contact, valve 87' is deenergized, so that valve 87' becomes closed, as well as gas valve 46'. At the same time, pressure valve 85 is closed. As the bellows tank becomes emptied, the upper contacts 80' close, but this does not affect anything since the lower relay 151 remains deenergized until contacts 81' close again.

Sterilization control valve 10' and its thermostatic control switch 25'' operate independently of the rest of the circuit. Thermostat contacts 134 and 135 of switch 25'' remain normally open, and valve 10' is deenergized and closed. When the temperature reaches the proper value (say 230° F.), contacts 134 and 135 of switch 25'' become closed, thus energizing valve 10' which opens to permit flow of water into bellows tank 71. When the temperature of the water reaches 320° F., contacts 136 and 137 of switch 25'' open, thus deenergizing and closing gas valve 46'.

Cooling water drain valve 93 and its thermostatic control switch 60'' also operate independently of the rest of the circuit. Switch 60'' is normally open and is closed when the temperature of the water reaches the preset value. When switch 60'' closes, it energizes drain valve 93, causing water to flow through cooler 15'.

It is understood that the electrical circuit shown in Figure 2 is merely illustrative of the manner of affecting the controls mentioned in the preceding description. By suitable modification, a similar electrical system may be applied to the arrangement shown in Figure 1.

The energized valves may be of the solenoid type or motor operated to prevent hammer knock. Contacts in the water are preferably of the mercury tube type for protection against corrosion and to permit overtravel of the bellows tank. Thermostatic valves may be employed for the combination of solenoid valve plus thermostatic control switch.

Valve 10' can be adjusted to open when the temperature of the water reaches, say 320° F., or it can, in turn, operate a time delay relay so that the water temperature must remain at 320° F. for, say 10 seconds, before the gas valve 46' is shut off.

I claim:

1. An apparatus for sterilizing raw water and discharging it through a sterile water line into a storage vessel provided with a high level and a low level water control, comprising a sterilizing coil capable of being heated to sterilizing temperature, a raw water feed line supplying raw water under pressure to said coil, an outlet line discharging sterilized water from said coil into said storage vessel, a normally-closed outlet valve in said outlet line, heating means for heating said coil to sterilizing temperature, a heat responsive switch in said outlet line upstream from said valve, valve opening and closing means responsive to said switch for opening the outlet valve only when the water temperature in said outlet line reaches sterilization temperature and closing said valve when the water temperature falls below sterilization temperature, said low level control comprising a second switch actuatable by a predetermined minimum water level, a remotely operated fuel valve acting as a source of ignitable fuel for heating said coil, valve operating means responsive to said second switch for opening said fuel valve, said high level control comprising a third switch actuatable by a predetermined maximum water level, and valve opening and closing means responsive to said third switch for closing said fuel valve.

2. An apparatus according to claim 1 in which a cooling coil is placed in the sterile water line upstream from the storage vessel, through which cooling coil the sterilized water is passed to be cooled, a jacket around said cooling coil through which raw water may be passed, an outlet line leading from said jacket for withdrawing said cooling water, an inlet line in said jacket for feeding therein cooling water under pressure, a remotely controlled valve in the inlet line to said jacket, an additional temperature actuatable switch in the sterile water line between the cooling coil and the storage vessel, valve opening and closing means responsive to said additional switch for operating the valve in the inlet line to said jacket and enabling the cooling water to maintain the sterilized water flowing through said cooling coil at a predetermined temperature.

3. An apparatus according to claim 2 in which the outlet line from said jacket is connected to the water feed line supplying water to the sterilizing coil.

4. An apparatus according to claim 2 in which a drain line is inserted in the outlet line leading from said jacket, a remotely controlled valve in said drain line, and valve opening and closing means responsive to said additional temperature actuatable switch for draining water from said jacket at a rate sufficient to maintain said sterile water at a predetermined temperature.

5. An apparatus for providing an automatic continuous supply of heat-sterilized water in which the raw water employed is available under pressure, comprising a heated coil in which the raw water is sterilized, a pipe feeding raw water into said coil, a pipe leading hot sterilized water out of said coil, a remotely controlled heat supply means for heating said coil, a thermostatically controlled switch in the pipe leading from the coil and provided with a minimum sterilizing temperature setting, a remotely controlled shut-off valve in the sterilized water pipe downstream from said switch, valve opening and closing means operated by said switch for closing said latter water shut-off valve when the sterilized water temperature falls below the minimum temperature setting, a storage vessel for storing said sterilized water, and remote control means actuated by the low water level and the high water level in said vessel for opening and closing said heat supply means.

6. An apparatus according to claim 5 comprising a second coil in the line downstream from said remotely controlled sterilized water shut-off valve and through which the sterile hot water is passed, a vessel supplied with water, disposed around said coil and acting as an indirect heat exchanger, inlet and outlet pipes connected to said vessel through which cold raw water is fed under pressure to cool the sterile water and then withdrawn, a thermostatically controlled switch with minimum temperature setting mounted in the outlet of said second coil, a remotely controlled shut-off valve in the inlet line of said vessel around said second coil, and valve opening and closing means responsive to said switch for opening said latter shut-off valve when said minimum temperature setting is exceeded and closing it when the water temperature falls below said minimum temperature setting.

7. An apparatus for providing an automatic continuous supply of heat-sterilized water from a raw water source, comprising a sterilizing coil capable of being heated to sterilizing temperature, a remotely controlled fuel supply means for heating said coil to sterilizing temperature, a raw water feed pipe supplying raw water under pressure to said coil, an outlet pipe discharging sterilized water from said coil, a normally-closed outlet valve in said outlet pipe, a temperature-responsive switch in said outlet pipe upstream from said valve, said switch having low temperature contacts set to close at the lowest sterilization temperature limit and higher temperature contacts set to close at a temperature well within the sterilization range, valve opening and closing means responsive to said switch for opening the outlet valve only when the higher temperature contacts are closed and closing said valve when the low temperature contacts are closed, a storage vessel for storing said sterilized water, and remote control means actuated by the low water level and the high water level in said vessel, for opening and closing said heat supply means.

8. A process for providing an automatic continuous supply of heat-sterilized water from a heated coil having an inlet, an outlet and a normally-closed valve on said outlet, comprising supplying a heating medium from a remotely controlled fuel supply means for heating said heated coil, feeding water into said heated coil under pressure, heating said water to sterilization temperature, opening said valve only when the water in said coil reaches sterilization temperature, closing said valve when the temperature falls below sterilization temperature, transferring the discharged sterilized water into a sterile storage system having a high and low level control means, and closing and opening said remotely controlled fuel supply means by said high and low level controls.

PETER J. GAYLOR.

References Cited in the file of this patent

UNITED STATES PATENTS

| Number | Name | Date |
| --- | --- | --- |
| 287,452 | McAllister | Oct. 30, 1883 |
| 1,033,896 | Humphrey | July 30, 1912 |
| 1,036,806 | Desmaroux | Aug. 27, 1912 |
| 1,255,602 | Harrison | Feb. 5, 1918 |
| 1,622,778 | Fowler | Mar. 29, 1927 |
| 1,802,635 | Eaton | Apr. 28, 1931 |
| 1,853,480 | Wheeler et al. | Apr. 12, 1932 |
| 1,991,863 | Morrow | Feb. 19, 1935 |
| 2,012,067 | Mayo | Aug. 20, 1935 |
| 2,067,629 | Flagg | Jan. 12, 1937 |
| 2,073,268 | Ray et al. | Mar. 9, 1937 |
| 2,170,402 | Faust | Aug. 22, 1939 |
| 2,214,175 | Olson | Sept. 10, 1940 |
| 2,236,087 | Detwiler | Mar. 25, 1941 |
| 2,302,469 | Patterson | Nov. 17, 1942 |
| 2,335,785 | Moore | Nov. 30, 1943 |
| 2,385,161 | Pinkerton | Sept. 18, 1945 |
| 2,392,021 | Wildermuth | Jan. 1, 1946 |
| 2,414,623 | Wildermuth | Jan. 21, 1947 |
| 2,522,796 | Olson et al. | Sept. 16, 1950 |
| 2,527,539 | Frisch | Oct. 31, 1950 |